April 29, 1924.
J. C. BERGNER
COOKING APPARATUS
Original Filed Oct. 29, 1919   4 Sheets-Sheet 1
1,492,541
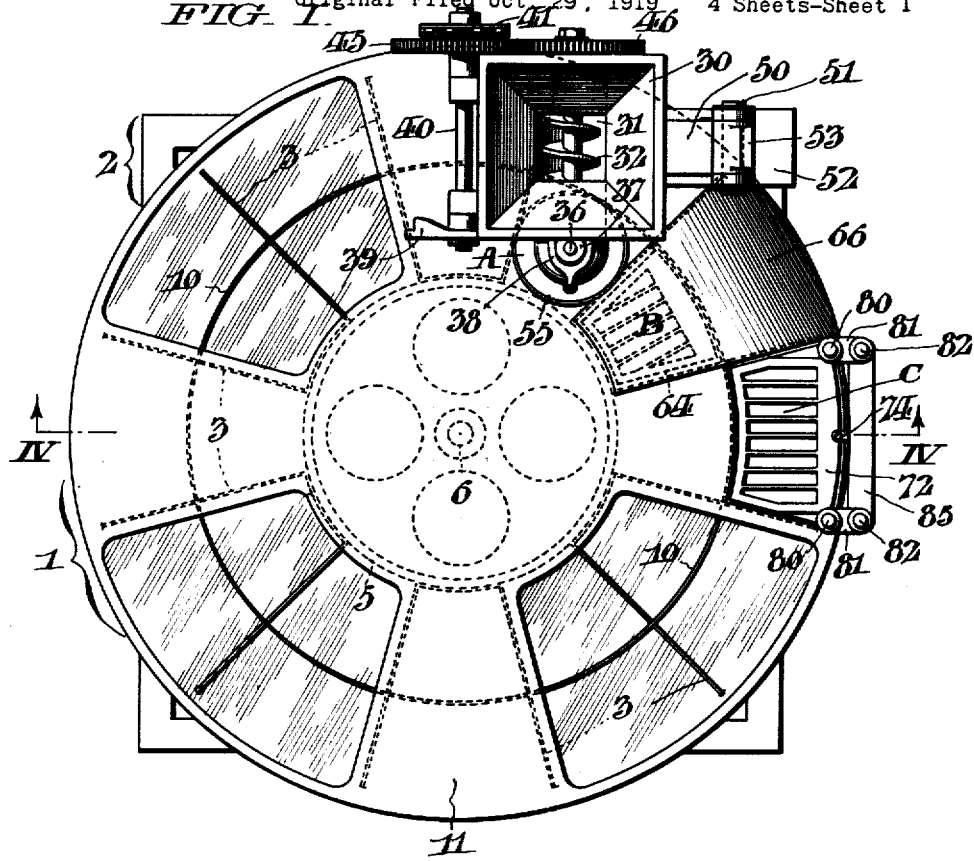
FIG. I.
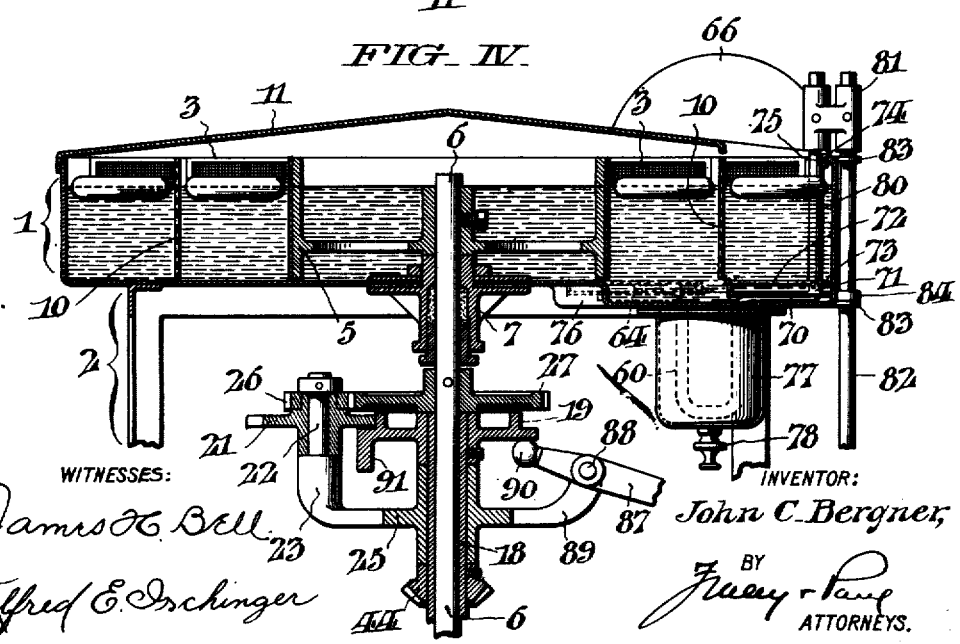
FIG. IV.
WITNESSES:
James H. Bell
Alfred E. Ischinger
INVENTOR:
John C. Bergner
BY
ATTORNEYS.

April 29, 1924.
J. C. BERGNER
1,492,541
COOKING APPARATUS
Original Filed Oct. 29, 1919     4 Sheets-Sheet 2
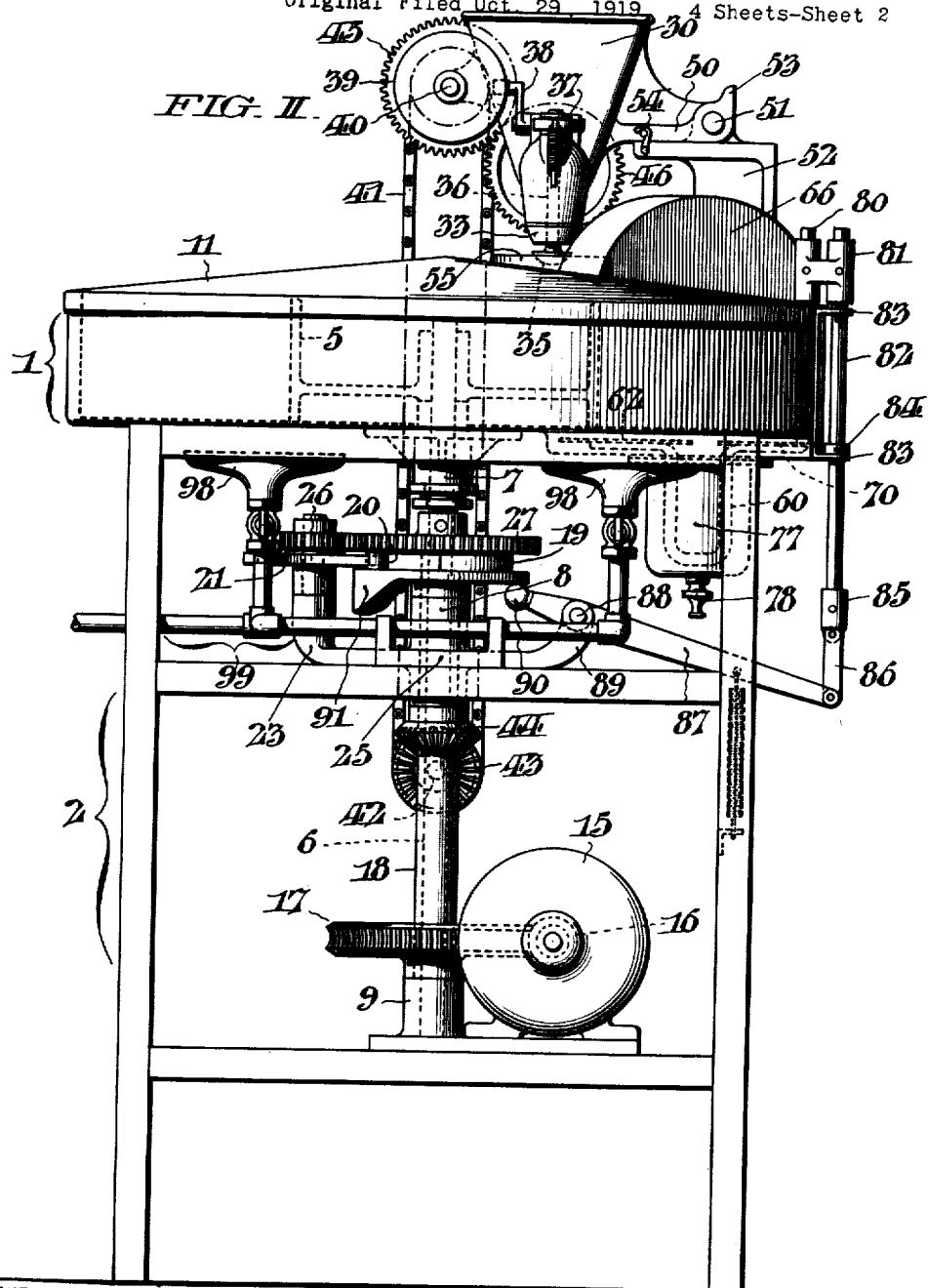
FIG. II
WITNESSES:
INVENTOR:
John C. Bergner,
ATTORNEYS.

April 29, 1924.
J. C. BERGNER
1,492,541
COOKING APPARATUS
Original Filed Oct. 29, 1919    4 Sheets-Sheet 3
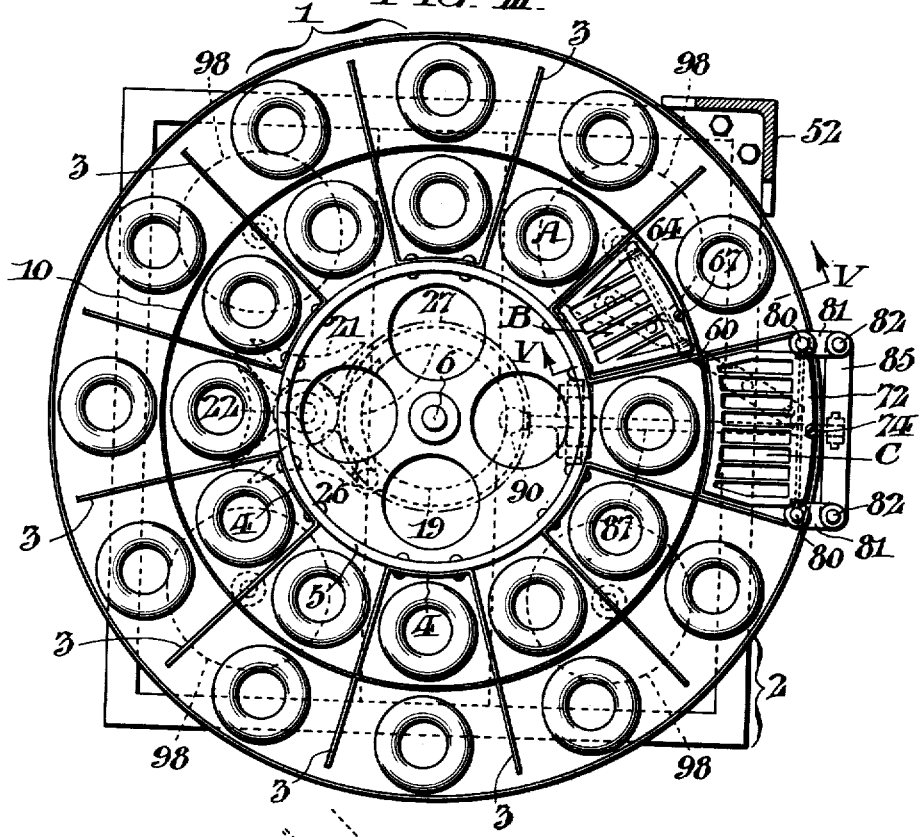
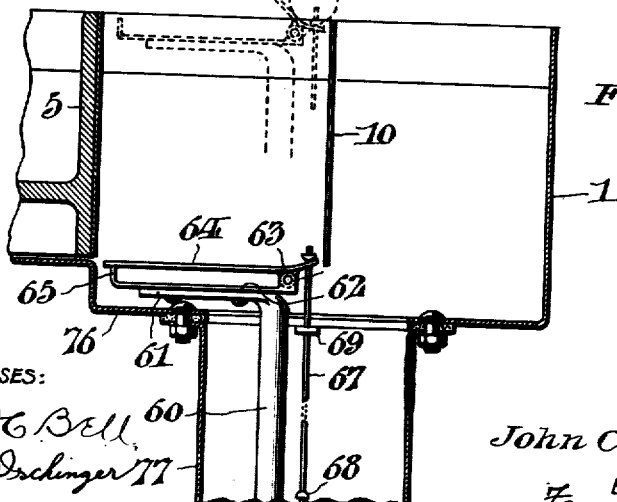
WITNESSES:
INVENTOR:
John C. Bergner,
BY
ATTORNEYS.

April 29, 1924.
J. C. BERGNER
1,492,541
COOKING APPARATUS
Original Filed Oct. 29, 1919    4 Sheets-Sheet 4
*FIG. VI.*
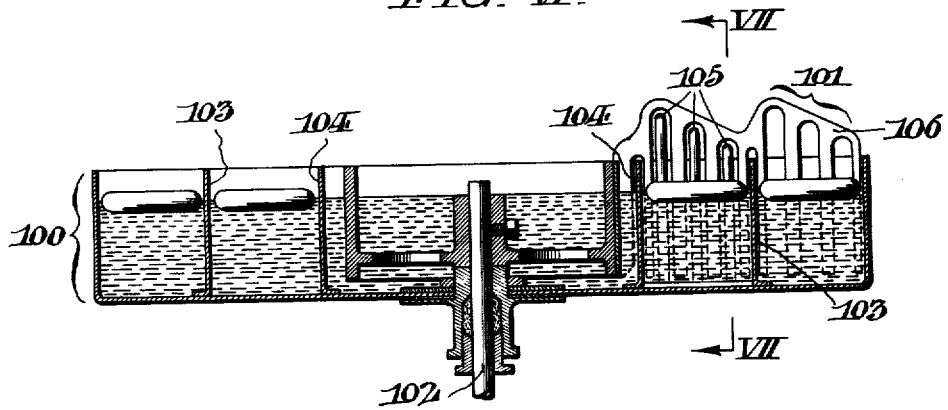
*FIG. VII.*
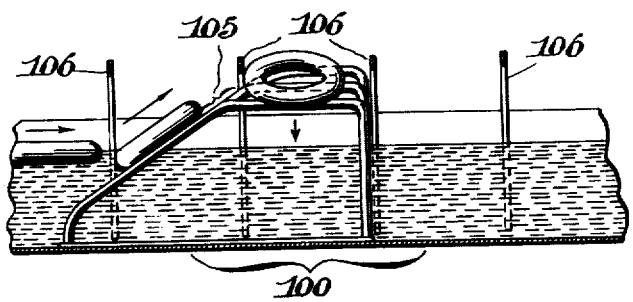
WITNESSES:
James H. Bell
Alfred E. Ischinger.
INVENTOR:
John C. Bergner,
BY
ATTORNEYS.

Patented Apr. 29, 1924.

1,492,541

UNITED STATES PATENT OFFICE.

JOHN C. BERGNER, OF PHILADELPHIA, PENNSYLVANIA, ASSIGNOR OF ONE-HALF TO FRANK ELLIS MORRIS, OF PHILADELPHIA, PENNSYLVANIA.

COOKING APPARATUS.

Application filed October 29, 1919, Serial No. 334,160. Renewed January 7, 1924.

*To all whom it may concern:*

Be it known that I, JOHN C. BERGNER, a citizen of the United States, residing in Philadelphia, in the county of Philadelphia and State of Pennsylvania, have invented certain new and useful Improvements in Cooking Apparatus, whereof the following is a specification, reference being had to the accompanying drawings.

The invention relates generally to that class of cooking apparatus wherein cooking is effected by the employment of a liquor, and more especially to apparatus adapted for forming and cooking pastries such as doughnuts, etc. Articles such as doughnuts (whose form or integrity is important, and whose nature or condition renders them liable to deformation or disruption) which are dealt with free, require handling quite different from what is permissible for articles of less delicate character,—such as cans of food products, for example.

It is my object to enable such articles to be produced continuously, rapidly and conveniently, with minimum labor and expense, and of uniformly good quality and appearance, and, in general, to secure the well-known advantages of efficient automatic manufacture in quantity. While my present invention is primarily concerned with the cooking apparatus itself (the particular forming device herein shown being in and by itself the subject of a separate application), yet the invention also extends to the combination and correlation with the cooking apparatus, when desired, of mechanism for forming the articles to be cooked,—so as to "integrate" the process of manufacture from the dough or other raw material to the final product,—as well as to the proper introduction of the articles into the cooking apparatus.

Not only, furthermore, does the invention admit of embodiment in a variety of specific forms and details, but, in its most highly organized aspects, it presents various novel features of operation and construction, and combinations and arrangements of mechanisms and parts, that are themselves valuable and useful,—either alone, or in other connections or relations than that shown,—as will readily be apparent to those skilled in the art from the description hereinafter of particular embodiments.

The scope and essentials of the invention in its diverse phases and aspects are indicated hereinafter in my claims. Their comprehension, and an adequate understanding of the embodiments hereinafter described, will be facilitated by a preliminary general explanation of certain of the features above referred to.

One feature of the apparatus herein described that is of great practical advantage is the maintenance of the articles in definite relative positions in the cooking liquor,—especially in the early stages of cooking,—so as to prevent adhesion and to insure free and uniform access of hot liquor to all parts of all the articles in the apparatus at any one time. Support of the articles by the liquor against, or so as to obviate deformation of them is also highly advantageous. Convenience and facility of manipulation and uniform access of the liquor to them is also promoted by cooking buoyant articles quite afloat in the liquor rather than otherwise supported,—even with exposure of the articles at the surface of the liquor so as to require turning over in order to cook completely.

Other advantageous and important features are the progression of the articles in the liquor in definitely maintained separation and succession, and, to this end, the introduction of the articles into engagement with the progressing means in definite correspondence and correlation with the succession of its engagement or positioning members. Important, also, are the definite correlation and correspondence of the removal or ejection of articles from the apparatus with their introduction, so as to prevent crowding, blocking, or accumulation. Other features of advantage in preventing crowding or blocking are direction of the succession of articles in the liquor through a series of definite channels, and transfer of the articles in definite succession from each channel to the next,—if desired, with concurrent turning over of the artciles in the liquor. Compactness and convenience are promoted by having such channels laterally adjacent, to permit transfer of the articles sidewise from one to another. It is, of course, important that the articles be so formed and introduced, progressed, and inverted or transferred that they shall not be materially deformed from their desired shape.

Another feature of great practical advantage is the employment of a circular type of receptacle for the cooking liquor, with appropriate adaptation and arrangement of the various operating parts and mechanisms. This allows the articles to be progressed over a gyratory or circling course including, for the sake of ecomony of space, a plurality of single circuit paths, rounds, or convolutions, one within another.

Other important features will become apparent as the description proceeds.

In the accompanying drawings, Fig. I, is a plan view of a complete cooking apparatus conveniently embodying my invention.

Fig. II, is a front elevation of the same as viewed from the bottom of Fig. I.

Fig. III, is a plan view of the apparatus, the top cover being removed, in order to expose the parts on the interior.

Fig. IV, is a partial axial sectional view of the apparatus along the line IV—IV., in Fig. I.

Fig. V, is a detail sectional view along the line V—V, in Fig. III.

Fig. VI, is an axial sectional view similar to Fig. IV, of a modified embodiment of my invention; and Fig. VII, is a diagrammatic detail sectional view of the same, as viewed in the direction of the arrows VII—VII in Fig. VI.

The apparatus herein shown comprises a circular pan or receptacle 1, adapted to contain the cooking liquor. This receptacle is suitably supported by a framework or stand comprehensively indicated at 2, and comprising uprights with cross-frames connecting them beneath the receptacle. As shown, this frame 2 is preferably constructed of structural iron. Within the receptacle 1, is a rotary carrier element which comprises a series of partially immersed radial vanes 3, of foraminated sheet metal, preferably formed in pairs, the connecting segment 4, (Fig. III) of each of such pairs being attached either by riveting or welding to a central or hub element 5. The latter is fixed to the top of a driving shaft 6, which extends down through the midst of the receptacle 1 (passing through a suitable stuffing box 7, at the bottom of the receptacle), and is journaled in bearings 8 and 9, (Fig. II) appropriately supported by the cross framing of the stand 2. The space between the periphery of the hub element 5, and the wall of the receptacle, is subdivided by a concentric circular band 10, into two distinct annular channels, and said band may be either a fixed element, (as will be readily understood from subsequent description), or may be made as a part of the carrier structure. The latter is the case in the present instance, and the band is accordingly interjoined, in any convenient manner, with the radial vanes 3, thereby forming in effect, two concentric series of cells arranged in radial rows, and each adapted to receive an individual formation and instrumental in guiding its charge over a predetermined course in the receptacle. As shown, there is an enclosure or cover 11 over the receptacle 1, which serves to confine fumes from the cooking, and at 66 affords space for the operation of doughnut manipulating means therein, besides having a receiving opening 55 and a doughnut discharge opening.

The means by which rotation of the carrier is effected comprises a driving motor 15, (preferably electric), mounted on the lower cross frame, and connected to the upright shaft 6 through reduction and other gearing. As here shown (see Figs. II and IV), the gearing includes a worm gear 16 on the motor shaft adapted to drive the worm wheel 17, which is fixed upon a sleeve 18, independently rotatable about the shaft 6. The said sleeve extends through the bearing 8, and as shown in Fig. IV, has fixed to its upper end one member 19, of a Geneva movement. Said member carries the roller 20, which operates in the radial slots of the companion member 21, of this movement. Member 21, is freely rotatable about a stud shaft 22, on a bracket 23, forming an integral part of the cross beam 25 (of the machine frame), by which the bearing 8, is carried. Superimposed upon the member 21, and adapted to rotate therewith, is a spur pinion 26, which meshes with a gear 27 pinned, as shown in Fig. IV, to shaft 6, to the top of which the carrier is secured. By this arrangement, said carrier is operated from beneath the receptacle 1, and intermittently rotated and shifted stepwise to present its cells successively to the co-operative associated mechanisms, as will be presently explained.

The articles which are to be cooked may be of any desired configuration, and may be introduced in any approved manner. In the present instance, I have shown the apparatus as applied to cooking pastries of annular or hollow configuration or form, and to this end a suitable forming mechanism has been combined therewith. This mechanism includes a hopper 30, which leads to a cylindrical casing 31, within which is housed a feed auger 32, the latter being adapted to force the dough through a suitable die member 33, with which co-operates a vertically reciprocating cutter member 35. This member is attached to a stem 36, which, at its upper protruding end, carries a collar 37, adapted for actuation, by means of a bell-crank lever 38, from a cam 39 fixed upon a shaft 40. Said shaft is journalled in suitable bearings projecting from the hopper 30, and is driven by means of a sprocket chain 41, from a shaft 42, which receives motion through bevel gears 43 and 44, from the sleeve 18, previously referred to. The feed auger 32, is driven by the shaft 40, through spur gears 45 and 46. In order that the hopper may be swung from its normal position, (shown in Fig. II.), to permit the removal of the cover 11, of the receptacle 1, its integral supporting arm 50, is pivotally mounted upon a fulcrum shaft 51, suitably journalled in lugs on a bracket 52, bolted (as shown in Fig. III.) to the standard 2. The arm 50 is provided with a projection 53, which, when the forming device is swung upward, serves to limit the extent of such motion and also to retain the same in retracted position. For the purpose of normally holding this device in the illustrated position, I have shown a locking means 54, consisting of a hook and pin combination, the construction of which is so simple as to obviate the necessity of detailed description. The outlet 33, of the forming device over-hangs a receiving opening 55, in the top cover 11 of the receptacle. For convenience I will distinguish the portion of the apparatus directly beneath the forming device or cutter as the receiving station, and will designate it by the letter "A". It will be seen that in the operation of the machine, the raw doughnuts currently formed by the forming device are intermittently released over the liquor to drop directly thereinto in a horizontal position,—a matter of some importance, in order to avoid deformation of them while still soft. It will further be seen that they are thus individually introduced for engagement by the engagement members or vanes 3 during the periods of rest of the latter, and in definite corespondence and correlation with the succession of these members. It will be noted that the vanes 3 between the cells extend from the surface of the liquor down close to the bottom of the receptacle, so as to insure complete and positive separation of the articles in the cells: this is of some practical importance, because doughnuts are at first heavier than the liquor, and only become buoyant after they have begun to cook. Complete submergence of the articles in the liquor (as they are one by one released and drop into position for proper engagement with the successive members 3) is permitted, it will be seen, by the depth of the receptacle and by said members.

The specific construction of the forming device herein shown forms no part of the present invention except in so far as its relation is concerned to the cooking apparatus proper, being itself described and claimed in a separate application previously filed by me Oct. 13, 1919, Serial No. 330,235, "Machines for forming pastries and the like."

In the course of the cooking operation, the formations deposited at the receiving station A, after having traversed the length of the inner channel, are transferred (and at the same time inverted), at a station "B", to the outer channel, through which they are likewise progressed, being finally ejected at a station "C". Transfer of the articles from the inner to the outer channel is accomplished by vertical and lateral displacement, by mechanism most clearly shown in Figs. III and V. This mechanism comprises a bracket 60, which is extended horizontally as at 61, to support a plate 62, preferably foraminated. Said plate 62 is provided with up-turned ears 63, to which is hinged a member 64, likewise in the form of a foraminated plate, and normally held in the horizontal position under the support of the vertical terminal edge 65, of the element 62. As will be subsequently described, the bracket 60, is intermittently raised and lowered in order to lift the formation from the cooking liquor to the level of the top edge of the receptacle 1, at which time the member 64, is swung forcibly about its pivot so as to effect inversion of the formations as indicated in Fig. V, and at the same time cause transfer of the same to the outer channel, under the guidance of a substantially semi-circular guard 66, which in the present case forms a part of the top cover 11, of the receptacle 1. The forcible swinging of the element 64, I effect through the instrumentality of an actuating rod 67, which, at its upper end is attached to a slight projection of the element 64, beyond the right of its pivot as viewed in Fig. V. To the lower end of the rod 67, is adjustably secured a collar 68, either by screw threaded engagement or some other equivalent means. After the transfer device has been elevated to the proper level, the collar 68, is suddenly engaged by a fixed stop 69, which is provided with a suitable opening within which the rod 67, is slideably guided during the greater part of its travel. It is to be noted that the forcible turning, which I have several times referred to is due to the multiplied leverage obtained by the particular disposal of the hinge joint.

Referring now to Figs. III, and IV, it will be seen that the device by which ejection from the outer channel is effected, is constructed along lines similar to those of the transfer device just described in that it consists of a plate 70, also perforated, and having ears 71, to which is hinged a swinging element 72. The plate 70, is also carried by the bracket 60, a horizontal attachment extension being provided for this purpose. The bracket 60, thus becomes common to both these devices and is functional in effecting simultaneous operation as will be later set forth. The means for actuating the swinging member 72, is slightly different from that of the transfer device, in that its projecting edge 73, is subject to the engagement of an adjustable stop in the form of a screw 74, threaded into a lug 75, at the upper edge of the receptacle, as clearly shown in Fig. IV. In order that the carrier member may readily move over the top of these co-active devices, the latter, when in their lower position are accommodated within a depression 76, at the bottom of the receptacle. Furthermore, in order to accommodate the bracket 60, without necessitating a receptacle of undue depth, I have provided a receiving pocket in the form of a cylindrical cup member 77, which may be bolted as shown in Fig. V, to the bottom of the depression 76, and provided with a cock 78, by means of which the contents of the receptacle may, from time to time, be drained. It will be seen from the above construction that the bracket 60, and its appendages, acts functionally as an elevator. In order that the same may be operated from the exterior of the receptacle, this structure is supported by companion rods 80—80, the lower ends of which are turned horizontally beneath and secured to the plate 70, and the upper ends of which extend above the top edge of the pan, where they are supported by bracket members 81, 81. As shown (see Figs. I, II, III and IV), the manipulating means 60, 64, 72 are actuated from beneath the pan 1, through connections extending down beside it, and including parallel slide rods 82, 82 on the upper ends of which the brackets 81, 81 are adjustably set. These rods 82, 82 are guided within bearings 83, 83, and their downward motion, is limited by stops 84, adapted to engage the lower guides 83. The lower ends of the rods 82, are united by a transverse bracket bar 85, which through a link 86, has pivotal connection, with one extremity of the lever 87, which is fulcrumed intermediate its ends at 88, to a bearing extension 89, of the beam 25, already referred to. On its opposite extremity, the lever 87, carries a spherical roller 90, which is adapted for co-operation with a cam 91, secured to the sleeve 18, and, as shown in the present instance, preferably formed as an integral part of the member 19, of the Geneva movement.

The operation of this form of my invention is as follows: The continued rotation of the sleeve 18, through the interposed worm couple, under the drive of the motor 15, is translated by means of the Geneva movement into intermittent rotary motion of shaft 6. This motion, owing to the operative characteristics of the Geneva movement, is practically instantaneous so that each two neighboring cells of inner series of the carrier (which, it will be remembered, is directly attached to the shaft 6), are simultaneously and successively presented respectively to the receiving station "A", and the transfer station "B", whilst cells of the outer series are likewise presented to the ejecting station "C". From Fig. I, it will be seen that the stations A and B are directly adjacent so that when the formations have been introduced and received from above at the station "A", they are progressed by the carrier along the inner channel, without any material deformation, for substantially a complete revolution to the transfer station "B", and at this point elevated from the cooking liquor, and thence transferred and introduced from above into the radially adjacent, companion cell in the outer channel, under restriction of the semi-circular guide 66. By the time they are at the point or station "B," the articles have acquired, by cooking in their initial series of positions, sufficient stability of form for transfer and inversion, as described above, without any material deformation. After being received in this outer channel, the articles are again successively progressed through substantially a complete revolution until they are presented at the ejecting station "C", and there discharged from the apparatus, as already described. By this arrangement, it will be noted, the formations are individually acted upon, and for each one received, another is transferred, and still another at the same time ejected, by reason of the simultaneous operation of the transfer device and the ejector. Such correspondence in operation amongst the doughnut former; the progressing means 3, and the other manipulating means 60, 64, 72 is definitely maintained at all times, by virtue of the definite correlation of their actuating mechanisms, as described above. The manipulating devices 64, 72 move up or down between successive vanes 3, in the intervals between step movements of the carrier. During the cooking operation the liquor is heated, in the present instance, by gas burners 98, supplied from a piping system indicated comprehensively at 99.

Referring now to Figs. VI, and VII, I have there shown a modified form of my invention, the receptacle for the cooking liquor being in this case represented by the numeral 100, the carrier at 101, and its supporting shaft at 102. The devices for intermittently actuating the carrier may be of the same construction as those shown in the previous instance. The receptacle 100, is directly subdivided into two separate channels by means of partitions 103 and 104, which may be secured by horizontally turned flanges, as shown, or in any other practical manner. The transfer between the channels, in this embodiment, is effected in a mode somewhat different from that of the first described form, by means of a structure comprehensively indicated at 105. This structure consists (see Fig. VII.) of a guide constituted of a number of spaced units, preferably in the form of stout wires, collectively bent so as to first elevate the articles gradually from the liquor whilst under the propulsion of the carrier vanes, and then to tilt the articles, to such an angle that they slide, under gravitation, over the partition 104, between the channels of the receptacle. In order to clear the structure 105, and also the partitions 103, and 104, the radial vanes 106, of the carrier 101, are cut away at intervals as shown in Fig. VI. Ejection from the outer channel may, in this case, be effected by a mechanism such as originally disclosed or simply by the duplication of the structure represented at 105. In all other respects, the operation of this modified embodiment of my invention is exactly the same as that of the first described form.

Having thus described my invention, I claim:

1. In apparatus for forming articles such as doughnuts and cooking them with hot liquor, the combination of means for forming raw articles in hollow configuration and releasing them over the liquor to drop in a horizontal position; means for progressing the articles in the liquor; and means for turning over the articles at a point in their progress where they have acquired sufficient stability therefor by cooking.

2. In apparatus for forming articles and cooking them with hot liquor, the combination of means for progressing the articles in the liquor; suitably stationed means for currently forming the articles and introducing them in definite succession; suitably stationed means for turning over the articles during their progression; means for ejecting the articles; and means for actuating said forming and introducing, said turning, and said ejecting means in definite correspondence and correlation with one another, so as to prevent accumulation or blocking in the apparatus.

3. Apparatus for forming articles such as doughnuts and cooking them with hot liquor, comprising means for forming and introducing the free doughnuts individually and in definite succession; means for progressing the doughnuts in definite separation and succession, supported by the liquor; and means for ejecting the doughnuts in definitely maintained correspondence and correlation with their introduction.

4. Apparatus for forming articles such as doughnuts and cooking them afloat in hot liquor, comprising means for currently forming and introducing the free doughnuts in definite predetermined succession; means for ejecting the doughnuts likewise in definite predetermined succession; and means for operating said forming and introducing and said ejecting means in definite correspondence and correlation with one another, so as to prevent accumulation or blocking in the apparatus.

5. In apparatus for cooking free articles with hot liquor, the combination of means for progressing the articles in definite succession afloat in the liquor; an elevator normally submerged beneath the path of the floating articles; and means for periodically raising said elevator to lift the articles from the liquor in succession and in definite correlation with their progression by said progressing means.

6. In apparatus for cooking articles such as doughnuts with hot liquor, the combination of means including a succession of moving engagement members for progressing the free doughnuts supported by the liquor; and means for manipulating the doughnuts movable up or down between said members.

7. In apparatus for forming articles such as doughnuts and cooking them with hot liquor, the combination of means including a succession of moving engagement members for progressing the articles in the liquor; and a cutter above the liquor operating to form the articles and to release them intermittently to drop directly, in a horizontal position and in definite correspondence and correlation with the succession of the aforesaid members, to be engaged and progressed by said members.

8. In apparatus for cooking articles such as doughnuts with hot liquor, the combination of means including a succession of moving members for engaging the free doughnuts and progressing them afloat in the liquor in definitely maintained separation and succession; and means for currently forming such free doughnuts and introducing them into proper engagement with said members, for progression as aforesaid, in definitely maintained correspondence and correlation with the succession of said members.

9. In apparatus for cooking free articles with hot liquor, the combination of means including a succession of intermitently moving engagement members for progressing the articles in the liquor; means stationed adjacent the path of said members for introducing such articles during and in definite correlation with the periods of rest of the aforesaid members, to be engaged and progressed by them; and means also stationed adjacent the path of said members for turning over and for ejecting the articles during and in definite correlation with the periods of rest of said members.

10. In apparatus for cooking articles, such as doughnuts with hot liquor, the combination of means including a succession of intermittently moving engagement members for progressing the free doughnuts supported by the liquor; means stationed adjacent the path of said members for introducing such free doughnuts during and in definite correlation with the periods of rest of the aforesaid members, to be engaged and progressed by them; and means also stationed adjacent the path of said members for ejecting the doughnuts during the periods of rest of said members.

11. In apparatus for cooking articles such as doughnuts with hot liquor, the combination of means including a succession of intermittently moving engagement members for progressing the free doughnuts supported by the liquor; and means for introducing such free doughnuts during and in definite correlation with the periods of rest of said members, to be engaged and progressed by them.

12. In apparatus for cooking free articles with hot liquor, the combination of means including a succession of intermittently moving engagement members for progressing the articles in the liquor; and means stationed adjacent the path of said members for turning over the articles during and in definite correlation with the periods of rest of said members.

13. In apparatus for cooking articles such as doughnuts with hot liquor, the combination of means including a succession of intermittently moving engagement members for progressing the free doughnuts supported by the liquor; and means stationed adjacent the path of said members for ejecting the doughnuts during and in definite correlation with the periods of rest of said members.

14. In apparatus for forming articles such as doughnuts and cooking them with hot liquor, the combination of a receptacle for the liquor; means including a succession of moving members immersed in the liquor for engaging the articles and progressing them therein in definitely and positively maintained separation and succession, said receptacle and said members permitting complete submergence of the articles in the liquor; and means for forming raw articles in hollow configuration and releasing them one by one over the liquor, to drop horizontal into proper position for engagement with said members, in definite correlation and correspondence with the succession of said members.

15. In apparatus for cooking free articles with hot liquor, the combination of a receptacle for the liquor; means for progressing the articles in the liquor including a succession of moving engagement members or vanes extending from the surface of the liquor down close to the bottom of the receptacle, so as to afford a series of completely separated cooking cells for the articles; means for introducing the articles into said cells from above, in definite correspondence and correlation with the succession of said members; and means for ejecting the articles upward from said cells.

16. In apparatus for cooking articles such as doughnuts afloat in hot liquor, the combination of a receptacle for the liquor; a movable carrier subdivided into a plurality of cooking cells for individual free doughnuts; and means for intermittently shifting said carrier to present its cells in succession at a station for receiving the free doughnuts and at a station for their ejection.

17. In apparatus for cooking free articles with hot liquor, the combination of means affording a plurality of laterally adjacent channels for progression of the articles in the liquor; means for introducing the articles from above into one of said channels; means for lifting the articles and transferring them sidewise from one channel to another; and means for ejecting the articles from the liquor in the last channel.

18. In apparatus for cooking articles such as doughnuts afloat in hot liquor, the combination of means affording a plurality of channels for progression of the free doughnuts in the liquor extending side by side; and means for bodily transferring the free doughtnuts sidewise from one channel to another past the barrier separating said channels, so that the doughnuts shall traverse said channels successively.

19. In apparatus for cooking free articles such as doughnuts with hot liquor, the combination of means affording a plurality of laterally adjacent channels for progression of articles in the liquor; and means for bodily transferring articles sidewise from one channel to another, by vertical and lateral displacement past the barrier separating said channels, so that the articles shall traverse said channels successively.

20. In apparatus for forming articles such as doughnuts and cooking them with hot liquor, the combination of means affording a plurality of laterally adjacent channels for articles in the liquor; means for forming raw articles in hollow configuration and releasing them over one of said channels to drop horizontal; and means for bodily transferring articles sidewise from said channel to another, after they have acquired sufficient stability therefor by cooking.

21. In apparatus for cooking articles such as doughnuts afloat in hot liquor, the combination of means affording a plurality of channels for progression of the free doughnuts in the liquor extending side by side; and means for concurrently transferring the doughnuts sidewise from one channel to another and for ejecting the doughnuts from the liquor in the last channel, so as to prevent accumulation or blockade in any channel.

22. In apparatus for cooking free articles afloat in hot liquor, the combination of means affording a plurality of laterally adjacent channels for progression of the articles in the liquor; and means for concurrently transferring the floating articles from one channel to another and turning them over, so that they shall traverse the several channels successively and in relatively inverted positions.

23. In apparatus for cooking articles such as doughnuts with hot liquor, the combination of a circular receptacle for the liquor; means for progressing the free doughnuts, supported by the liquor against deformation over a gyratory course circling said receptacle; means for currently forming and introducing the doughnuts at one end of said course; and means for ejecting them at the other end thereof.

24. In apparatus for forming articles such as doughnuts and cooking them in hot liquor, the combination of a circular receptacle for the liquor; means including a succession of moving members immersed in the liquor for engaging articles and progressing them over a gyratory course therein, in definitely maintained separation; and means for forming raw articles in hollow configuration and releasing them one by one over the liquor, to drop in a horizontal position, in definite correspondence and correlation with the succession of said members.

25. In apparatus for cooking articles such as doughnuts with hot liquor, the combination of a circular receptacle for the liquor; means for progressing the free doughnuts, supported by liquor against deformation, over a plurality of single circuit gyratory paths side by side one within another; means for introducing the free doughnuts from above at the beginning of each path; and means for ejecting the doughnuts.

26. In apparatus for cooking articles such as doughnuts with hot liquor, the combination of a circular receptacle for the liquor; means for progressing free doughnuts, supported by the liquor against deformation, over a gyratory course comprising a plurality of successive convolutions or rounds one within another; means for introducing the free doughnuts at the inner end of said course; and means for ejecting them over the side of the vessel at the outer end of said course.

27. In apparatus for cooking buoyant articles such as doughnuts with hot liquor, the combination of a circular receptacle for the liquor; and means for progressing the free doughnuts afloat in the liquor over a gyratory course comprising a plurality of successive convolutions or rounds one within another.

28. Apparatus for cooking articles such as doughnuts with hot liquor comprising a circular receptacle for the liquor subdivided to afford a plurality of circling channels for progression of the free doughnuts supported by the liquor against deformation, one channel round within another; means for introducing the free doughnuts from above into each channel; and means for ejecting the doughnuts.

29. Apparatus for cooking articles such as doughnuts with hot liquor comprising a circular receptacle for the liquor subdivided to afford a plurality of channel convolutions or rounds for the free doughnuts, one within another; means immersed in the liquor for progressing the free doughnuts supported by the liquor through said channel convolutions in succession, from within outward; and means for ejecting the doughnuts from the liquor in the outside channel convolution.

30. Apparatus for cooking articles such as doughnuts afloat in hot liquor comprising a circular receptacle for the liquor subdivided to afford a plurality of circling channels for the free doughnuts, one within another; means for engaging and progressing free doughnuts in said channels; and means for transferring the doughnuts bodily past the channel-separating barrier, so that they may traverse adjacent channels successively.

31. In apparatus for cooking articles such as doughnuts afloat in hot liquor, the combination of a circular receptacle for the liquor subdivided to afford a plurality of circling channels for progression of the floating free doughnuts; and means for lifting and transferring the doughnuts from one channel to another in the course of their progression through the receptacle.

32. Apparatus for cooking free articles with hot liquor comprising a circular receptacle for the liquor subdivided to afford a plurality of substantially concentric channels; an intermittently rotating carrier substantially concentric with said channels for concurrently engaging and progressing a multiplicity of articles in each of them; and means for successively transferring articles from one of said channels to another during the successive periods of rest of said carrier.

33. In apparatus for cooking free articles with hot liquor, the combination of a circular receptacle for the liquor; an intermittently rotating carrier for progressing the articles in the liquor in definite relative positions; means for shifting the articles from one position to another with reference to said carrier during their progression; means for ejecting the articles; and means for actuating said shifting and said ejecting means in alternation with the movements of the carrier.

34. In apparatus for cooking articles such as doughnuts afloat in hot liquor, the combination of a circular receptacle for the liquor; a rotary carrier substantially coaxial with said receptacle subdivided into a multiplicity of cooking cells for the free doughnuts; and means for intermittently rotating said carrier to present its cells successively at a station where the free doughnuts are received and at a station where they are ejected.

35. In apparatus for cooking articles such as doughnuts in hot liquor, the combination of a circular receptacle for the liquor; a rotary carrier subdivided into a plurality of concentric series of cooking cells for the individual articles; and means for transferring the articles from one series of cells to another during their progression in the liquor by said carrier.

36. In apparatus for cooking articles with hot liquor, the combination of positioning means for maintaining a multiplicity of individual articles suitably separated and in definite relative positions in the liquor; means for currently forming the articles co-operating with said positioning means to successively allocate them, definitely and individually, to such positions; and means for ejecting the articles operating in definite correspondence and correlation with their introduction.

37. In apparatus for cooking free articles with hot liquor, the combination of positioning means for maintaining a multiplicity of individual articles suitably separated and in definite relative positions in the liquor; means for introducing articles co-operating with said positioning means to successively allocate them, definitely and individually, to certain of said positions; and means operating in definite correspondence and correlation with said introducing means to transfer the articles so introduced to other positions with reference to said positioning means and to afterwards eject them.

38. In apparatus for cooking free articles with hot liquor, the combination of positioning means affording a plurality of series of definitely maintained separate positions for the articles, said series of positions extending side by side; means for successively introducing and allocating articles to the positions of one series; and means for transferring articles from the several positions in one series to positions in another in recurrent succession.

39. In apparatus for cooking free articles with hot liquor, the combination of positioning means affording a plurality of rows of definitely maintained separate positions for the articles; and means for successively transferring articles from one position to another along each row.

40. In apparatus for forming articles such as doughnuts and cooking them with hot liquor, the combination of a circular receptacle for the liquor; means for forming raw articles in hollow configuration and successively releasing them to drop horizontal, and for allocating them to a circling series of positions in said receptacle; and means for bodily transferring articles sidewise to an adjacent circling series of positions, after they have acquired sufficient stability therefor by cooking in the initial series of positions.

41. In apparatus for forming articles such as doughnuts and cooking them with hot liquor, the combination of a circular receptacle for the liquor; means for forming raw articles in hollow configuration and successively releasing them to drop horizontal, and for allocating them to a circling series of positions in said receptacle; and means for turning over the articles after they have acquired sufficient stability therefor by cooking.

42. Apparatus for cooking free articles with hot liquor comprising a circular receptacle for the liquor; positioning means affording a plurality of circling series of definitely maintained separate positions for the articles, one series within another; means for introducing articles co-operating with said positioning means to allocate them to the positions of an inner series; means for transferring the articles so introduced outward from one series to another; and means for ejecting the articles out of the apparatus from the positions of the outermost series.

43. Apparatus for cooking articles with hot liquor comprising a circular receptacle for the liquor subdivided to afford a plurality of circularly arranged cells for the free doughnuts; means for introducing free doughnuts from above into said cells; and means for ejecting the doughnuts upward and outward over the side of the receptacle.

44. In apparatus for cooking free articles such as doughnuts in hot liquor, the combination of a circular receptacle for the liquor; and means of subdivision comprising a central hub, a plurality of radial vanes, and circumferential extending partition means intermediate said hub and the outer vessel wall co-operating with said vanes to subdivide the vessel into a plurality of circular rows of cooking cells for the free doughnuts.

45. A cellular subdividing unit or carrier for a circular cooking vessel comprising a central hub, a series of integral pairs of radial vanes united by segments secured to said hub; and a band concentric with said hub interjoined with said radial vanes.

46. A device for manipulating free articles cooked in hot liquor comprising an elevator for engaging the articles from beneath while in the liquor and raising them, said elevator having an element movable relatively thereto on which the articles are supported while being so raised; and means for tilting or swinging said element to discharge the raised articles from the elevator.

47. A device for manipulating free articles cooked in hot liquor comprising an elevator for engaging the articles from beneath while in the liquor and raising them, said elevator having a hinged element on which the articles are supported while being so raised; and a stop for engaging one edge of said hinged element as it rises to swing it about its hinge axis and discharge the articles from the elevator.

48. A device for manipulating free articles cooked in hot liquor comprising an elevator for engaging the articles from beneath while in the liquor and raising them, said elevator having an element hinged in close proximity to one of its edges on which the articles are supported while being so raised; and means for engaging said element near its pivotal axis, as it rises, so as to swing it forcibly thereabout and discharge the articles from the elevator.

49. A device for manipulating free articles cooked in hot liquor comprising an elevator for engaging the articles from beneath while in the liquor and raising them, said elevator having an element hinged in proximity to one of its edges on which the articles are supported while being so raised; an actuating rod with a stop thereon attached at the one end to said element; and means associated with said element for engaging said stop to swing said element about its hinge axis during the movement of the elevator.

50. In mechanism for manipulating free articles cooked in hot liquor, the combination of means for transferring the articles from one part of the apparatus to another; and means for ejecting them; said transferring and ejecting means comprising a common elevator for engaging the articles from beneath while in the liquor and raising them, separately movable elements mounted on said elevator by which the articles to be transferred and those to be ejected are respectively supported while being so raised, and means for actuating said elements to discharge the articles from the elevator.

51. In a doughnut machine, the combination of a receptacle for cooking liquor; a doughnut former over said receptacle; means for progressing doughnuts in the liquor and for turning them over; and means for actuating said forming, progressing and turning means from beneath the receptacle.

52. In a doughnut machine, the combination of a receptacle for cooking liquor; a rotary carrier for progressing doughnuts in said receptacle; means for manipulating the doughnuts during their progression; and means for operating said carrier and said progressing means from beneath said receptacle, including a drive shaft for the carrier extending down through the midst of the receptacle and actuating connection for the manipulating means extending down beside the receptacle.

53. In a doughnut machine, the combination of a receptacle for cooking liquor; a rotary carrier for progressing doughnuts in the liquor; means for manipulating the doughnuts during their progression; and means beneath said receptacle for imparting to said carrier a step-wise rotation, and for actuating said manipulating means in the intervals between step movements of said carrier.

54. In a doughnut machine, the combination of a receptacle for cooking liquor; a doughnut former over said receptacle; a rotary carrier for progressing doughnuts in the liquor; means for manipulating the doughnuts movable up or down in said receptacle; and means beneath said receptacle for imparting to said carrier a step-wise rotation and actuating said former, and for actuating said manipulating means in the intervals between step movements of said carrier.

55. In a doughnut machine, the combination of a receptacle for cooking liquor; a framework supporting said receptacle, comprising uprights and cross frames connecting said uprights beneath said receptacle; a rotary carrier for progressing doughnuts in said receptacle; and means for operating said carrier including a drive shaft extending down through the midst of said receptacle, with actuating gearing therefor carried by the cross framing, and a motor mounted on the framework for actuating said shaft through said gearing.

56. In a doughnut machine, the combination of a frame; a receptacle for hot cooking liquor carried thereby, with an enclosure thereover for confining fumes; a doughnut former manipulating means in said enclosure, including a rotary carrier for progressing the doughnuts in said receptacle; and means for driving said carrier and actuating said former including a motor and reduction gearing on said frame beneath said receptacle, with an upright drive shaft for the carrier extending up through the midst of the receptacle.

57. In apparatus for cooking articles such as doughnuts progressed afloat in hot liquor, the combination of means for introducing the free doughnuts at automatically predetermined definite intervals; and means for ejecting the doughnuts in like manner operating in definitely and automatically maintained correspondence and correlation with their introduction, so as to prevent accumulation or blocking in the apparatus.

58. In apparatus for cooking articles such as doughnuts with hot liquor, the combination of means including a succession of moving engagement members immersed in the liquor for progressing the free doughnuts supported by the liquor; means for introducing the free doughnuts at automatically predetermined definite intervals operating in definitely and automatically maintained correspondence and correlation with the succession of the aforesaid members, to be engaged and progressed by them; and means for ejecting the doughnuts also at automatically predetermined definite intervals operating in definitely and automatically maintained correspondence and correlation with the succession of said members, and with their introduction.

59. In apparatus for cooking articles such as doughnuts with hot liquor, the combination of means including a succession of moving members for engaging the free doughnuts and progressing them afloat in the liquor in definitely maintained separation and succession; and means for introducing such free doughnuts at automatically predetermined definite intervals definitely and automatically correlated and corresponding with the succession of said members, so as to insure their proper engagement with said members for progression as aforesaid.

60. In apparatus for cooking free articles such as doughnuts in hot liquor, means for progressing said articles and a device for manipulating said articles, comprising a a movable element for engaging the articles from beneath, with means for raising said element to lift the articles clear of the liquor, and means for giving it a relatively rapid flipping movement to turn over the articles and re-introduce them into the liquor.

61. In apparatus for cooking free articles such as doughnuts in hot liquor, the combination of a continuous succession of cells for maintaining a multiplicity of the articles individually separated in the liquor, and means for transferring each of the articles from one cell to the next succeeding cell.

In testimony whereof, I have hereunto signed my name at Philadelphia, Pennsylvania, this 28th day of October, 1919.

JOHN C. BERGNER.

Witnesses:
JAMES H. BELL,
E. L. FULLERTON.

DISCLAIMER 1,492,541.—*John C. Bergner*, Philadelphia, Pa. COOKING APPARATUS. Patent dated April 29, 1924. Disclaimer filed March 9, 1933, by the assignee, *Doughnut Machine Corporation*.

Hereby enters the following disclaimer, to wit:

The assignee, Doughnut Machine Corporation, hereby disclaims claim 51.

The assignee, Doughnut Machine Corporation, hereby disclaims from claims 7, 8, 36, 37, 38, 58, and 59 of said Letters Patent any apparatus except one for receiving raw dough and automatically forming annular doughnut forms, wherein the cutter successively cuts the annular doughnut forms free to release them and drop them in a horizontal position into the liquor, and the moving progressing means engage the doughnut forms only after the horizontally falling forms encounter or are immersed in the liquor, so as to be thereby supported and protected against deformation while cooking and acquiring stable form, whereby the doughnut forms in their soft or raw state are transferred from the cutter to the liquor and brought under the action of the progressing means without deformation by encounter with either the liquor or the progressing means, and cooked and produced as doughnuts in undeformed substantially circular formation.

[*Official Gazette April 11, 1933.*]